United States Patent
Matsuura et al.

(10) Patent No.: US 9,928,970 B2
(45) Date of Patent: Mar. 27, 2018

(54) LITHIUM ION CAPACITOR

(71) Applicant: JTEKT CORPORATION, Osaki-shi (JP)

(72) Inventors: Takashi Matsuura, Konan (JP); Koji Nishi, Anjo (JP); Naoki Ohmi, Chiryu (JP); Yukihiro Komatsubara, Chiryu (JP); Sachiko Kubota, Nagoya (JP); Takashi Tamura, Itami (JP); Takumi Mio, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 6 days.

(21) Appl. No.: 15/130,425

(22) Filed: Apr. 15, 2016

(65) Prior Publication Data

US 2016/0314909 A1  Oct. 27, 2016

(30) Foreign Application Priority Data

Apr. 23, 2015 (JP) ................. 2015-088190
Jul. 10, 2015 (JP) ................. 2015-139022
Oct. 16, 2015 (JP) ................. 2015-204632

(51) Int. Cl.
  *H01G 11/06* (2013.01)
  *H01G 11/50* (2013.01)
  (Continued)

(52) U.S. Cl.
  CPC ............ *H01G 11/62* (2013.01); *H01G 11/06* (2013.01); *H01G 11/28* (2013.01); *H01G 11/38* (2013.01);
  (Continued)

(58) Field of Classification Search
  CPC .................. H01G 11/24; H01G 11/50
  (Continued)

(56) References Cited

U.S. PATENT DOCUMENTS 9,011,709 B2 *  4/2015  Choi ............... H01G 11/60
                                              252/62.2
2009/0111030 A1  4/2009  Hojo et al.
2009/0297954 A1  12/2009  Hasegawa et al.
2012/0058379 A1  3/2012  Kishi et al.
(Continued)

FOREIGN PATENT DOCUMENTS

EP  2 023 427 A1  2/2009
EP  2 565 973 A1  3/2013
(Continued)

OTHER PUBLICATIONS

Extended European Search Report dated Sep. 12, 2016 in Patent Application No. 16165717.6.

*Primary Examiner* — Eric Thomas
(74) *Attorney, Agent, or Firm* — Oblon, McClelland, Maier & Neustadt, L.L.P.

(57) ABSTRACT

Provided is a lithium ion capacitor that can retain a capacity under a high temperature environment and has small increase in internal resistance while using an aqueous binder for a positive electrode. A lithium ion capacitor includes: a positive electrode; a negative electrode; and an electrolytic solution contacting the positive electrode and the negative electrode. The electrolytic solution includes an organic solvent and a lithium salt electrolyte having an imide structure; the positive electrode includes a collector foil and a positive electrode active material; and the positive electrode active material is held onto the collector foil through a binder including a polymer having a RED value to the electrolytic solution of more than 1, the RED value representing a relative energy difference with respect to the electrolytic solution based on Hansen solubility parameters.

7 Claims, 4 Drawing Sheets

(51) Int. Cl.
  *H01G 11/58* (2013.01)
  *H01G 11/24* (2013.01)
  *H01G 11/62* (2013.01)
  *H01G 11/28* (2013.01)
  *H01G 11/38* (2013.01)
  *H01G 11/60* (2013.01)

(52) U.S. Cl.
  CPC ............ *H01G 11/50* (2013.01); *H01G 11/60* (2013.01); *Y02E 60/13* (2013.01)

(58) Field of Classification Search
  USPC .......................................................... 361/502
  See application file for complete search history.

(56) References Cited

U.S. PATENT DOCUMENTS

| | | |
|---|---|---|
| 2013/0040209 A1 | 2/2013 | Mio et al. |
| 2014/0038045 A1* | 2/2014 | Lee ...................... H01M 4/137 429/213 |
| 2014/0054496 A1 | 2/2014 | Hanasaki et al. |
| 2015/0137030 A1 | 5/2015 | Matsuo et al. |

FOREIGN PATENT DOCUMENTS

| | | |
|---|---|---|
| EP | 2 677 573 A1 | 12/2013 |
| JP | 2007-19108 A | 1/2007 |
| JP | 2014-160638 | 9/2014 |

* cited by examiner

* WHEN PRECIPITATION OCCURS,
  THE IONIC CONDUCTANCE IS DETERMINED TO BE 0.

FIG.6

* WHEN PRECIPITATION OCCURS,
  THE IONIC CONDUCTANCE IS DETERMINED TO BE 0.

LITHIUM ION CAPACITOR

INCORPORATION BY REFERENCE

The disclosure of Japanese Patent Application No. 2015-204632 filed on Oct. 16, 2015, No. 2015-088190 filed on Apr. 23, 2015, and No. 2015-139022 filed on Jul. 10, 2015 including the specification, drawings and abstract is incorporated herein by reference in its entirety.

BACKGROUND OF THE INVENTION

1. Field of the Invention

The present invention relates to a lithium ion capacitor.

2. Description of Related Art

A lithium ion capacitor is what is called a hybrid capacitor. In the capacitor, typically, an electrode that physically adsorbs and desorbs ions by holding an active material such as activated carbon onto a collector foils is used as a positive electrode and an electrode that adsorbs and desorbs lithium ions by oxidation-reduction reaction is used as a negative electrode. The development of various applications is expected for the lithium ion capacitor as an electric power storage device that can satisfy both large capacity and high output and, for example, automotive applications of the capacitor have been studied.

In association with the above, Japanese Patent Application Publication No. 2014-160638 (JP 2014-160638 A) describes a binder for electrodes for binding an active material to the collector foil. Although this invention focuses on a lithium-ion battery rather than the lithium ion capacitor, it is developed in consideration of using the battery including a capacitor for automotive applications. A styrene-butadiene rubber (SBR) conventionally used as a binder for electrodes is an aqueous binder and the binder is desirable because the environmental load in the manufacturing process of the electrodes can be easily reduced. In contrast, JP 2014-160638 A points out the problem of oxidative deterioration of SBR when it is used for the positive electrode of a lithium ion battery, and states that an aqueous binder containing a specific constitution unit derived from a monomer having a hydroxy group and a specific constitution unit derived from a polyfunctional (meth)acrylate monomer and having a highly cross-linked structure does not cause oxidative deterioration and performance of this aqueous binder is not affected even under a use environment at a relatively high temperature of 60° C.

For the automotive applications of the lithium ion capacitor, however, a use environment at a higher temperature is assumed. In the case of installation in a vehicle compartment, a lithium ion capacitor having a durability at 85° C. is generally required. In contrast, the binder for electrodes described in JP 2014-160638 A is assumed to be used in a high temperature environment at 60° C. and thus a durability of this binder for electrodes at 85° C. is not secured when the binder is applied to the lithium ion capacitor. Examples of aqueous binders used for electrodes include PEO*PEG (a mixture of polyethylene oxide and polyethylene glycol) and an acrylic-based thermoplastic elastomer. The binding force of these aqueous binders, however, decreases under the high temperature environment at 85° C. When these aqueous binders are used as the binders for the positive electrode of the lithium ion capacitor, significant increase in the resistance generated from the positive electrode has been demonstrated.

Under the high temperature environment at 85° C., an electrolytic solution is also affected by heat. JP 2014-160638 A, however, only focuses on the binder for electrodes and does not consider the durability of the electrolytic solution. Thus, JP 2014-160638 A states that a lithium salt compound, which is commonly used for a lithium ion battery, can be used as an electrolyte. In the specific example, lithium hexafluorophosphate is used. However, it has been found that under the high temperature environment at 85° C. the lithium ion capacitor using lithium fluorophosphate as the electrolyte has significant decrease in capacity and large increase in internal resistance and thus cannot be used.

SUMMARY OF THE INVENTION

An object of the present invention is to provide a lithium ion capacitor that can retain capacity under a high temperature environment at 85° C. and has small increase in internal resistance.

An aspect of the present invention relates to a lithium ion capacitor including: a positive electrode; a negative electrode; and an electrolytic solution contacting to the positive electrode and the negative electrode. The electrolytic solution includes an organic solvent and a lithium salt electrolyte having an imide structure; the positive electrode includes a collector foil and a positive electrode active material; and the positive electrode active material is held onto the collector foil through a binder including a polymer having a RED value to the electrolytic solution of more than 1, the RED value representing a relative energy difference with respect to the electrolytic solution based on Hansen solubility parameters.

The lithium ion capacitor according to the present invention can retain the capacity under the high temperature environment at 85° C. and can reduce the increase in internal resistance.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, main constituents of the lithium ion capacitor in one embodiment of the present invention will be described. The lithium ion capacitor of the present invention has at least a positive electrode, a negative electrode, and an electrolytic solution contacting to the positive electrode and the negative electrode.

The electrolytic solution contains a solvent and an electrolyte.

As the solvent, organic solvents conventionally used for the lithium ion capacitor are used and examples of this type of the organic solvent include a carbonate organic solvent, a nitrile organic solvent, a lactone organic solvent, an ether organic solvent, an alcohol organic solvent, an ester organic solvent, an amide organic solvent, a sulfone organic solvent, a ketone organic solvent, and an aromatic organic solvent. These solvents can be used singly or in combination of two or more of them in an appropriate composition ratio. Examples of the carbonate organic solvent include cyclic carbonates such as ethylene carbonate (EC), propylene carbonate (PC), and fluoroethylene carbonate (FEC) and chain carbonate such as ethylmethyl carbonate (EMC), diethyl carbonate (DEC), and dimethyl carbonate (DMC).

Examples of the nitrile organic solvent include acetonitrile, acrylonitrile, adiponitrile, valeronitrile, and isobutyronitrile. Examples of the lactone organic solvent include γ-butyrolactone and γ-valerolactone. Examples of the ether organic solvent include cyclic ethers such as tetrahydrofuran and dioxane and chain ethers such as 1,2-dimethoxyethane, dimethyl ether, and triglyme. Examples of the alcohol organic solvent include ethyl alcohol and ethylene glycol. Examples of the ester organic solvent include methyl acetate, propyl acetate, phosphoric acid esters such as trimethyl phosphate, sulfate esters such as dimethyl sulfate, and sulfite esters such as dimethyl sulfite. Examples of the amide organic solvent include N-methyl-2-pyrrolidone and ethylene diamine. Examples of the sulfone organic solvent include chain sulfones such as dimethyl sulfone and cyclic sulfones such as 3-sulfolene. Examples of the ketone organic solvent include methyl ethyl ketone and examples of the aromatic organic solvent include toluene. The various solvents except the carbonate organic solvent are preferably used with the cyclic carbonate (particularly, ethylene carbonate (EC)) as a mixture and, for example, expected to be used as a substitute of the chain carbonate described below.

In the electrolytic solution of the lithium ion capacitor, the carbonate organic solvent having excellent oxidation resistance is preferably used in consideration of a usable voltage range (e.g., about +4.0 V for Li). In addition, the electrolytic solution preferably has high ionic conductance (S/m, S: Siemens and m: meter) that is an indicator of internal resistance. The ionic conductance can be increased by decreasing the viscosity of the electrolytic solution and increasing the degree of dissociation of the electrolyte (described below). Thus, the carbonate organic solvent made by mixing the cyclic carbonate, which increases the degree of dissociation of the electrolyte, and the chain carbonate, which has low viscosity, is further preferably used as the organic solvent (refer to [Table 6]).

As the chain carbonate, various chain carbonates can be used. However, dimethyl carbonate (DMC), which has a low boiling point and lower heat resistance, is preferably unused from the viewpoint of improvement in the heat resistance of the electrolytic solution (refer to [Table 6]). In other words, when dimethyl carbonate (DMC) is contained in the organic solvent, dimethyl carbonate (DMC) turns into diethyl carbonate (DEC) due to thermal decomposition and decomposition by-products generated during the thermal decomposition may cause increase in internal resistance or deterioration in heat resistance (this assumption, however, does not limit the scope of the present invention). In consideration of the use of the lithium ion capacitor under a high temperature environment, ethylmethyl carbonate (EMC), which has relatively high boiling point and low viscosity, or diethyl carbonate (DEC), which has higher boiling point, is preferably used as the chain carbonate. From the viewpoint of improvement in both ionic conductance and heat resistance of the electrolytic solution, the use of ethylmethyl carbonate (EMC) and diethyl carbonate (DEC) as a mixture is more preferable. A ratio of ethylmethyl carbonate (EMC) and diethyl carbonate (DEC) in the organic solvent is not particularly limited and, for example, can be set in a range of EMC:DEC=2:1 to 1:2.

As the cyclic carbonate, various cyclic carbonates can be used and ethylene carbonate (EC), which has a solid-electrolytic solution interphase (SEI) film generation ability, is preferably used from the viewpoint of improvement in the oxidation resistance of the electrolytic solution. When ethylene carbonate (EC) and other cyclic carbonate (for example, PC) are used as a mixture as a cyclic carbonate, ethylene carbonate (EC) is preferably contained in a higher amount than the amount of other cyclic carbonate (for example, PC). As described above, the solid-electrolytic solution interphase (SEI) film generation ability is suitably exerted by containing ethylene carbonate (EC) in a relatively higher amount to form a protective film called SEI on the surface of the negative electrode after ethylene carbonate (EC) is reductively decomposed and thus the electrolytic solution is not directly exposed to the electric potential of lithium (Li).

In consideration of the use of the lithium ion capacitor under a low temperature environment, it is desired to suppress the solidification of the electrolytic solution and the precipitation of solvent components as much as possible under a low temperature environment at about −40° C. Thus, when ethylene carbonate (EC), which has a high melting point, is used as the cyclic carbonate, a ratio of ethylene carbonate (EC) to the total amount of the organic solvent is preferably set to less than 35% by volume. By using ethylene carbonate (EC) and propylene carbonate (PC), which has low melting point, as a mixture, the content of the cyclic carbonate in the organic solvent can be increased while suppressing the solidification of the electrolytic solution and the precipitation of solvent components as much as possible. At this time, a ratio of the total amount of ethylene carbonate (EC) and propylene carbonate (PC) to the total amount of the organic solvent is preferably set to less than 55% by volume and more preferably set to less than 40% by volume. The ratio of the total amount of ethylene carbonate (EC) and propylene carbonate (PC) of more than 55% by volume results in significant increase in the possibility of occurrence of the solidification of the electrolytic solution and the precipitation of the solvent components under the low temperature environment. In the case of the ratio of the total amount of ethylene carbonate (EC) and propylene carbonate (PC) of 40% by volume or more, the desired ionic conductance may fail to be obtained under the low temperature environment. When ethylene carbonate (EC) and propylene carbonate (PC) are used as a mixture, the ratio of the total amount of the mixture of ethylene carbonate (EC) and propylene carbonate (PC) to the total amount of the organic solvent is preferably set in a range of 35% by volume to 20% by volume, whereby the desired ionic conductance can be obtained in a wide temperature range (for example, in a range of 25° C. to −40° C.) without causing the solidification of the electrolytic solution and the precipitation of the solvent components as much as possible.

The electrolyte ionizes into lithium ions and anions to contribute to charge and discharge reaction and mainly includes a lithium salt having a imide structure. Examples of the lithium salt having an imide structure include lithium bis(fluorosulfonyl)imide [LiFSI], lithium bis(trifluoromethanesulfonyl)imide [LiTFSI], and lithium bis(pentafluoroethanesulfonyl)imide [LiBETI]. The lithium salts having an imide structure can be used singly or in combination of two or more of them. Other lithium salt electrolyte may be used with the above electrolyte in such a range that does not inhibit the effect of the present invention. The electrolyte is preferably contained in the electrolytic solution in a concentration of 0.5 mol/L to 10.0 mol/L. The concentration of the electrolyte of less than 0.5 mol/L tends to decrease ionic conductance due to insufficient ion concentration. On the other hand, the concentration of the electrolyte of more than 10.0 mol/L tends to decrease ionic conductance due to increase in the viscosity of the electrolytic solution. The concentration of the electrolyte is more preferably 0.5 mol/L to 2.0 mol/L. In this case, the viscosity of the electrolytic solution is optimum and thus the ionic conductance is difficult to decrease.

Additives may be adequately added to the electrolytic solution. Examples of the additives include vinylene carbonate (VC) and fluoroethylene carbonate (FEC).

In the positive electrode, an electric double layer is formed at the time of charging and discharging by physical adsorption and desorption of ions. The positive electrode includes at least a collector foil, a positive electrode active material, and a binder, and includes a conduction aid, if needed. The positive electrode is configured to hold the positive electrode active material and the like on the collector foil through the binder.

As the collector foil, collector foils conventionally used for the lithium ion capacitors can be applied. For example, a metal foil made of aluminum, stainless steel etc., which is perforated and has conductivity can be used.

As the positive electrode active material, particles capable of adsorbing and desorbing ions and having high specific surface area can be used. Examples of such a positive electrode active material include activated carbon and carbon nanotube.

The binder is used for binding materials constituting the positive electrode. The binder includes a polymer being an adhesive component as a main component. The polymer has a relative energy difference (RED) value to the electrolytic solution of more than 1, based on Hansen solubility parameters (HSP). Examples of such a polymer include polyacrylic acid. Here, polyacrylic acid has a wider concept that includes not only unneutralized polyacrylic acid but also neutralized salt of polyacrylic acid and crosslinked polyacrylic acid. Polyacrylic acid may be used singly or in combination of two or more of them. As the solvent dissolving the polymer, water and an organic solvent can be used. An aqueous binder using water as the solvent is preferable because the environmental load during the manufacturing process can be reduced. Polyacrylic acid is also preferable because it can form an aqueous binder together with water as the solvent.

Figure 1:
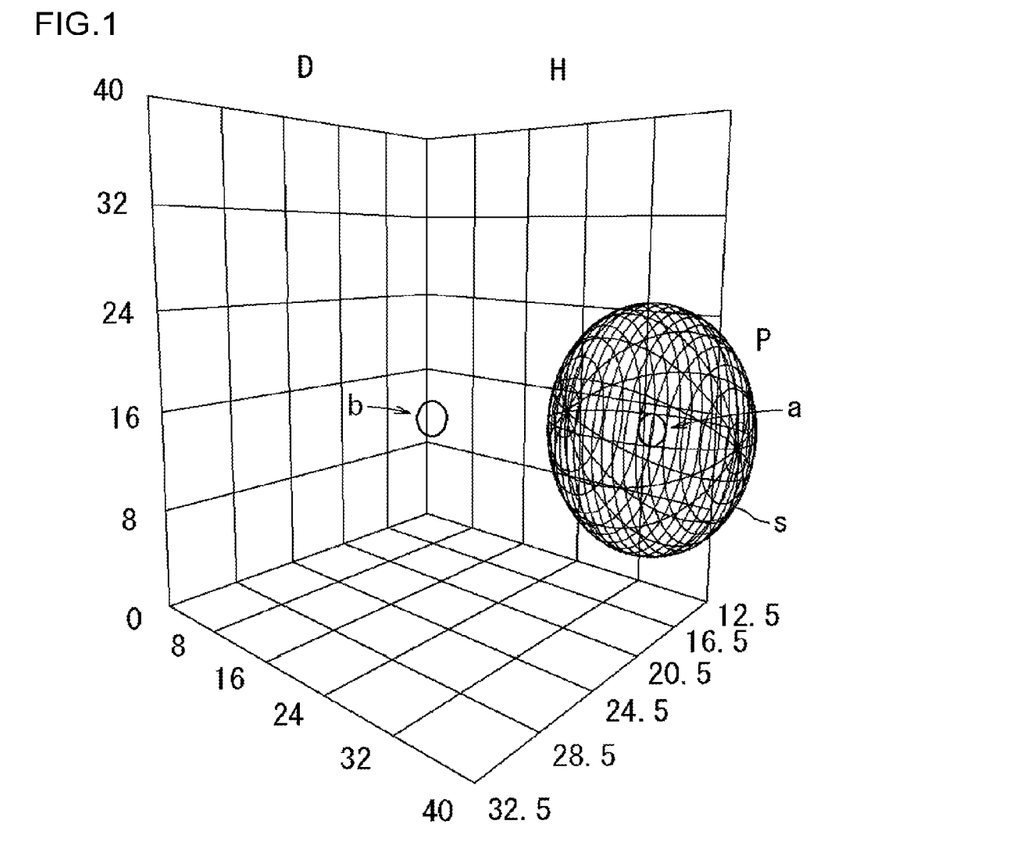
FIG. 1 is a diagram illustrating Hansen solubility parameters of an electrolytic solution and a polymer contained in a binder in Hansen space.

Hansen solubility parameters were presented by Dr. Charles M Hansen and are known as indice of solubility between substances. Hansen solubility parameters consist of the following three numeric values of D, P, and H and the three parameters are expressed as a coordinate in a three-dimensional space (Hansen space). FIG. 1 illustrates a sign a assigned for Hansen solubility parameters of the polymer and a sign b assigned for Hansen solubility parameters of the electrolytic solution in Hansen space.

D: (atomic) dispersion force
P: (molecular) polarizing force,
H: (molecular) hydrogen bonding force Solubility between the substances is presumed from the distance between the coordinates each indicating Hansen solubility parameters of the corresponding substance. A smaller distance between the coordinates indicates higher solubility while a larger distance between the coordinates indicates lower solubility.

Hansen solubility parameters of the electrolytic solution can be calculated from the chemical structures and the composition ratio of the components. In this case, Hansen solubility parameters can be calculated by using the software HSPiP (Hansen Solubility Parameters in Practice: software for Windows [registered trademark] for effectively treating HSP).

Figure 2:
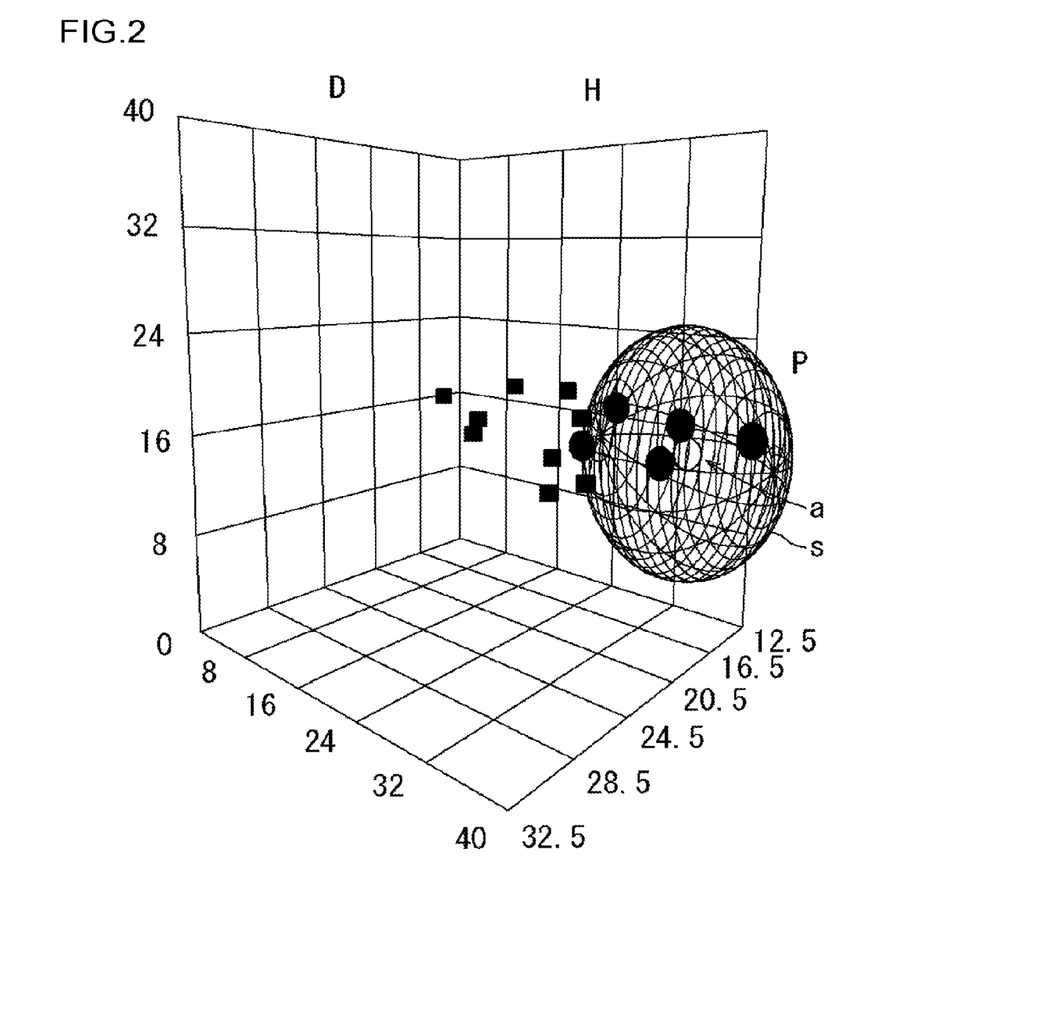
FIG. 2 is a diagram illustrating a method for determining a dissolution sphere of the polymer contained in the binder.

In order to determine Hansen solubility parameters of a polymer, the polymer is dissolved (mixed) into a plurality of solvents whose Hansen solubility parameters are known and Hansen solubility parameters of the solvent that dissolve the polymer and the solvent that does not dissolve the polymer are plotted in Hansen space. The center of the sphere (Hansen's dissolution sphere) formed by the collection of the plotted points of the solvents that dissolve the polymer is determined to be Hansen solubility parameters of the polymer. The dissolution sphere and Hansen solubility parameters of the polymer can be calculated using the software HSPiP. In FIG. 2, the case of using polyacrylic acid (a sodium-neutralized salt of polyacrylic acid) as the polymer is shown as an example. Hansen solubility parameters of the solvent that dissolves the polyacrylic acid are illustrated as a black circle and Hansen solubility parameters of the solvent that does not dissolve the polyacrylic acid are illustrated as a black square. The calculated dissolution sphere s is illustrated. The coordinate of the center of the dissolution sphere s illustrated as a white circle is determined to be Hansen solubility parameters a of the polymer.

The RED value of the polymer to the electrolytic solution is determined by RED=$R_a/R_0$, where a distance between Hansen solubility parameters of the polymer and Hansen solubility parameters of the electrolytic solution is $R_a$ and an interaction radius that is a radius of the dissolution sphere of the polymer is $R_0$. As illustrated in FIG. 1, when the RED value of the polymer to the electrolytic solution is higher than 1, Hansen solubility parameters b of the electrolytic solution are positioned out of the dissolution sphere s of the polymer and thus the electrolytic solution and the polymer are difficult to dissolve each other. In FIG. 1, as the solubility parameters of the electrolytic solution, Hansen solubility parameters of the electrolytic solution of 1 mol/L of lithium bis(fluorosulfonyl)imide [LiFSI] contained in a mixed solvent of 30% by volume of ethylene carbonate (EC), 30% by volume of dimethyl carbonate (DMC), and 40% by volume of ethylmethyl carbonate (EMC) are exemplified.

The binder is preferably added in an amount of 1% by mass to 10% by mass relative to the mass of the positive electrode active material. The binder of less than 1% by mass tends to have insufficient binding force. On the other hand, the binder of more than 10% by mass may cause increase in conductor resistance.

The conduction aid may be added, as necessary, in order to decrease conductor resistance in the positive electrode and at interface of the collector foil. As the conduction aid, conduction aids used for conventional lithium ion capacitors can be used. Examples of the conduction aid include acetylene black, and graphite fine particles and fine fibers.

The positive electrode is produced by applying, to the collector foil, a slurry for positive electrodes prepared by mixing other constituents with water serving as a solvent, to form a coating film. When the thickening action of the binder in the slurry for positive electrodes is insufficient, a thickener such as carboxymethyl cellulose may be appropriately added. In this case, the total amount of the added binder and thickener is preferably 1% by mass to 10% by mass relative to the mass of the positive electrode active material. The amount of water to be added as a solvent is preferably adjusted so that the range of the measured value of the viscosity of the slurry at $2S^{-1}$ measured with a B-type viscometer is 1,000 mPa·s to 10,000 mPa·s, because with such an amount of water added the coating film is easily formed on the collector foil.

In the negative electrode, lithium ions are adsorbed and desorbed at the time of charging and discharging. As the negative electrode, negative electrodes constituting conventional lithium ion capacitors can be used. Typically, examples of the negative electrode include negative electrodes holding a negative electrode active material such as graphite that can adsorb and desorb lithium ions on the collector foil through a binder. Examples of the collector foil of the negative electrode include a copper foil, an aluminum foil, and a stainless steel foil. As the binder, conventionally used binders can be applied. From the viewpoint of environment protection, aqueous binders such as a styrene-butadiene rubber (SBR) binder are preferable.

The configuration of the lithium ion capacitor of the present invention will be described. The lithium ion capacitor of the present invention can have a cell form configuration similarly to conventional lithium ion capacitors. For example, the lithium ion capacitor of the present invention can be a stacked-type cell in which the positive electrode and the negative electrode are stacked with a separator interposed therebetween or a wound-type cell in which the positive electrode and the negative electrode are wound with a separator interposed therebetween.

The amounts of the applied slurries for positive electrodes and negative electrodes of the above embodiment are adjusted depending on the discharge capacity and the sizes of the positive electrode, the negative electrode, for example. The thickness of the collector foil is such a thickness that the collection foil is not damaged during the manufacturing and is adjusted depending on the internal resistance performance of the lithium ion capacitor and the like. The solvent is changed in association with the performance of the lithium ion capacitor.

A method for producing the positive electrode will be described. First, activated carbon powder as the positive electrode active material, polyacrylic acid (a sodium neutralized salt of polyacrylic acid), acrylic acid ester, or styrene-butadiene rubber (SBR) as the binder, acetylene black as the conduction aid, carboxymethylcellulose (CMC) as the thickener, and water as the solvent were used to prepare Slurry A to Slurry C for positive electrodes containing the positive electrode active material having compositions listed in Table 1. In Table 1, "parts" means parts by mass and "%" means % by mass.

TABLE 1

| Slurry for positive electrode | Type of binder | Positive electrode active material | Conduction aid | Binder | Thickener | Solvent (water) |
|---|---|---|---|---|---|---|
| A | Polyacrylic acid | 88 parts | 15 parts (17%) | 6 parts (7%) | — | 345 parts |
| B | Acrylic acid ester | 88 parts | 15 parts (17%) | 3 parts (3%) | 1 part | 220 parts |
| C | SBR | 88 parts | 15 parts (17%) | 1 part (1%) | 1 part | 220 parts |

Slurry A for positive electrodes using polyacrylic acid as the binder was prepared by the following procedure:
(1) All materials and water were mixed with a mixer aa (ARE-310, manufactured by THINKY CORPORATION) to prepare a preslurry.
(2) The preslurry obtained in (1) was further mixed with a mixer bb (Model 40-L, manufactured by PRIM IX Corporation) to prepare an intermediate slurry.
(3) The intermediate slurry obtained in (2) was further mixed with the mixer aa to prepare Slurry A for positive electrodes.

Slurry B and Slurry C for positive electrodes containing acrylic acid ester and SBR, respectively, as the binder were prepared by the following procedure:
(1) Materials other than the binder and water were mixed with the mixer aa to prepare a preslurry.
(2) The preslurry obtained in (1) is further mixed with a mixer bb to prepare an intermediate slurry.
(3) The binder was added to the intermediate slurry obtained in (2) and the resultant mixture was further mixed with the mixer aa to prepare Slurry B or Slurry C for positive electrodes.

Subsequently, an aluminum foil (a porous foil) having a thickness of 15 μm was used as the collector foil and each of Slurry A to Slurry C for positive electrodes was applied to the collector foil and dried to prepare Positive Electrode CA to Positive Electrode CC. The amount of the applied slurry for positive electrodes was adjusted so that the mass of the activated carbon after drying was 3 mg/cm². A blade coater and a die coater were used for the application of the slurry for positive electrodes to the collector foil.

A method for producing the negative electrode will be described. First, 95 parts by mass of graphite as the negative electrode active material, 1 part by mass of SBR as the binder, 1 part by mass of CMC as the thickener, and 100 parts by mass of water as the solvent were mixed to prepare the slurry for negative electrodes by the following procedure.
(1) Materials other than the binder and water were mixed with the mixer aa to prepare a preslurry.
(2) The preslurry obtained in (1) was further mixed with a mixer bb to prepare an intermediate slurry.
(3) The binder was added to the intermediate slurry obtained in (2) and the resultant mixture was mixed with the mixer aa to prepare the slurry for negative electrodes.

Subsequently, a copper foil (a porous foil) having a thickness of 10 μm was used as the collector foil and the slurry for negative electrodes was applied to the collector foil and dried to prepare the negative electrode. The amount of the applied slurry for negative electrodes was adjusted so that the mass of the graphite after drying was 3 mg/cm². A blade coater was used for the application of the slurry for negative electrodes to the collector foil.

A method for preparing the electrolytic solution will be described. The mixed solvent of 30% by volume of ethylene carbonate (EC), 30% by volume of dimethyl carbonate (DMC), and 40% by volume of ethylmethyl carbonate (EMC) was used as the solvent and 1 mol/L of lithium bis(fluorosulfonyl)imide (LiFSI) was added to the mixed solvent to prepare Electrolytic Solution I. Lithium hexafluorophosphate (LiPF$_6$) was added to the mixed solvent to prepare Electrolytic Solution P2. The mixed solvent of 30% by volume of ethylene carbonate (EC), 46.7% by volume of ethylmethyl carbonate (EMC), 23.3% by volume of diethyl carbonate (DEC), and 10% by volume of propylene carbonate (PC) was used as the solvent and 1 mol/L of lithium bis(fluorosulfonyl)imide (LiFSI) was added to the mixed solvent to prepare Electrolytic Solution I2.

A method for producing a lithium ion capacitor cell for evaluation will be described. Lithium ion capacitor cells for evaluation in Examples and Comparative Examples were produced in combinations of the positive electrodes and the electrolytes listed in Table 2 by the following procedure:

(1) The positive electrode and the negative electrode each having a rectangular shape with a size of 60 mm×40 mm were stamped out. A portion of the coating film of each electrode in a region of 20 mm×40 mm at one end in a direction along the long sides was stripped off with the coating film of 40 mm×40 mm left, and a collecting tab was attached to the stripped-off part.

(2) A stacked body was prepared by facing the film-coated parts of the positive electrode and the negative electrode with a cellulose separator having a thickness of 20 μm interposed therebetween.

(3) The stacked body prepared in (2) and a metal lithium foil for lithium predoping were encapsulated in an aluminum laminated foil. The electrolytic solution is injected therein and the aluminum laminated foil was sealed to produce the lithium ion capacitor cell for evaluation.

TABLE 2

| | Positive electrode (binder) | Electrolytic solution (electrolyte) | RED value |
|---|---|---|---|
| Example 1 | A (Polyacrylic acid) | I (LiFSI) | 2.48 |
| Example 2 | A (Polyacrylic acid) | I2 (LiFSI) | More than 1 |
| Comparative Example 1 | B (Acrylic acid ester) | I (LiFSI) | 0.21 |
| Comparative Example 2 | C (SBR) | I (LiFSI) | 0.61 |
| Comparative Example 3 | C (SBR) | P (LiPF$_6$) | 0.61 |

A method for measuring initial performance will be described. For each of the produced lithium ion capacitor cells for evaluation, lithium predoping, charge and discharge, and aging were performed. Thereafter, internal resistance and discharge capacity were measured at a cut-off voltage of 2.2 V to 3.8 V and a measurement current of 10 C at normal temperature (25° C.). The results were determined to be the initial performance.

A method of durability test (float test at 85° C.) will be described. The lithium ion capacitor cell for evaluation connected to an external power source to maintain a voltage at 3.8 V was left standing in a constant-temperature chamber at 85° C. The time for which the lithium ion capacitor cell was left standing corresponds to 85° C.-3.8V float time. After the predetermined time passed, the lithium ion capacitor cell for evaluation was taken out from the constant-temperature chamber and the cell was cooled to normal temperature. Thereafter, the internal resistance and the discharge capacity were measured in the same conditions as the measurement of the initial performance to calculate a capacity retention ratio (a percentage of the discharge capacity when the initial discharge capacity is set to be 100%) and an internal resistance increase ratio (an increase in the internal resistance from the initial performance). The results are listed in Table 3 and illustrated in FIG. 3 or FIG. 4.

TABLE 3

| | | 85° C.-3.8 V float time [h] | | | | | | |
|---|---|---|---|---|---|---|---|---|
| | | 0 | 180 | 230 | 500 | 550 | 787 | 1000 |
| Example 1 | Capacity retention ratio | 100% | 119% | | | 115% | | 93% |
| | Internal resistance increase ratio | 0% | 4% | | | 42% | | 283% |
| Example 2 | Capacity retention ratio | 100% | | 105% | 104% | | 101% | 100% |
| | Internal resistance increase ratio | 0% | | 0% | 3% | | 11% | 15% |
| Comparative Example 1 | Capacity retention ratio | 100% | 104% | — | — | — | — | — |
| | Internal resistance increase ratio | 0% | 438% | — | — | — | — | — |
| Comparative Example 2 | Capacity retention ratio | 100% | | | 115% | | | 100% |
| | Internal resistance increase ratio | 0% | | | 297% | | | 1035% |
| Comparative Example 3 | Capacity retention ratio | 100% | 48% | — | — | — | — | — |
| | Internal resistance increase ratio | 0% | 116% | — | — | — | — | — |

Figure 3:
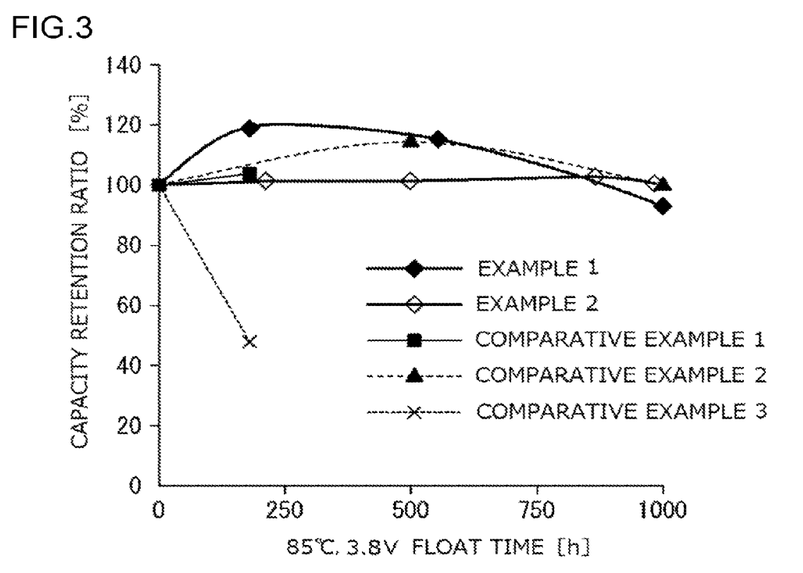
FIG. 3 is a graph illustrating a capacity retention ratio of the lithium ion capacitor having been left standing under a high temperature (85° C.) environment.
Figure 4:
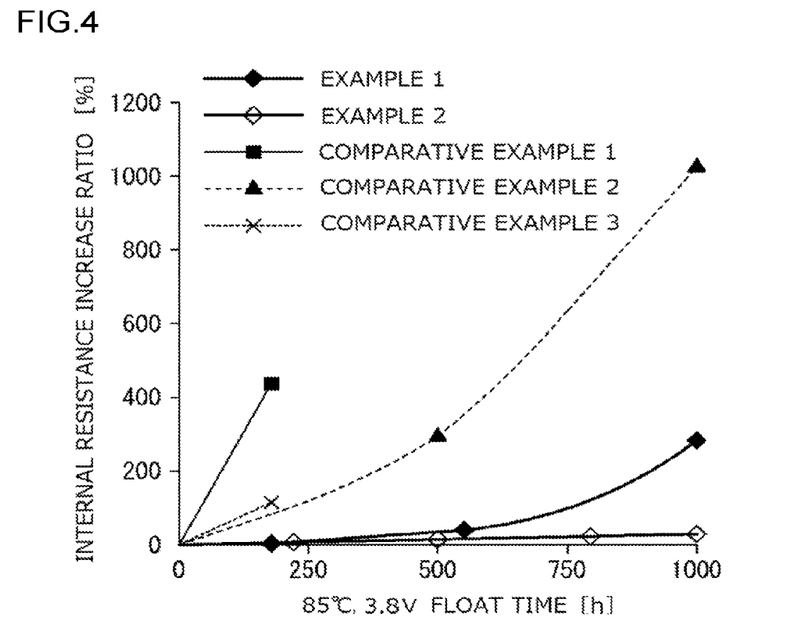
FIG. 4 is a graph illustrating an internal resistance increase ratio of the lithium ion capacitor having been left standing under the high temperature (85° C.) environment.

As illustrated in FIG. 3, when the cell was left standing in a high temperature environment at 85° C., in Comparative Example 3 using the electrolytic solution containing lithium hexafluorophosphate having no imide structure as the electrolyte, the capacity retention ratio decreased by half in a short period, whereas in Example 1, Example 2, Comparative example 1, and Comparative Example 2, the capacity retention ratio was maintained high for a long time. As illustrated in FIG. 4 etc., however, it was clarified that even when the electrolytic solution containing the lithium salt having the imide structure as the electrolyte was used, the internal resistance increase ratios differed depending on the constituents of the binder of the positive electrode. When the RED values (refer to Table 2) of the polymers constituting the binders of the positive electrode to the electrolytic solutions were compared, it was found that Comparative Example 1 using acrylic acid ester and Comparative Example 2 using SBR, which had RED values of 1 or less, had high internal resistance increase ratios. In contrast, Example 1 and Example 2 use the electrolytic solution containing the lithium salt having the imide structure as the electrolyte and polyacrylic acid, which has a RED value to the electrolytic solution of more than 1, as the polymer constituting the binder of the positive electrode. In this case, it was found that the polymer constituting the binder of the positive electrode is difficult to be dissolved in the electrolytic solution and the high capacity retention ratio and low internal resistance increase ratio were retained even under a high temperature environment at 85° C. In particular, it was found that Example 2 maintained the internal resistance increase ratio low. It was easily inferred that the result of Example 2 is obtained because dimethyl carbonate (DMC) was not contained and ethylene carbonate (EC) was contained in a higher amount than the amount of propylene carbonate (PC) in carbonate organic solvent serving as the organic solvent. In order to calculate the RED value, the calculation of Hansen solubility parameters and the interaction radius of the polymer and the calculation of Hansen solubility parameters of the electrolytic solution were carried out by the following procedure.

Methods for calculating Hansen solubility parameters and the interaction radius of the polymer will be described. For each binder, the interaction radius $R_0$ and Hansen solubility parameters of the polymer were calculated by the following procedure:

(1) Preparation of Sample for Test

The binder dissolved in water was dropped on a Teflon sheet (Teflon is a registered trademark, a sheet of polytetrafluoroethylene) and dried at 60° C. for at least 1 day to prepare the sample for the test.

(2) Preparation of Solvent for Test

In the compositions listed in Table 4, solvents for the test from No. 1 to No. 29 were prepared. Each of the prepared solvents for the test was poured into a vial bottle having a capacity of 10 mL. In the case of a solvent having high hygroscopic property, molecular sieve 3A was also placed in the vial bottle to prepare the solvents for the test.

(3) Swelling Test

The sample for the test was immersed in each solvent for the test. Each sample was left standing at normal temperature for 1 day to 14 days to observe the change in the shape of the sample. When a difference in shape change (the degree of swelling) due to the solvent for the test was not observed, the sample was left standing at 60° C.

(4) Evaluation of Shape Change

Subsequent to (3), the shape change in the sample for the test due to each of the solvents for the test was determined and rated in the following four levels: 0: No change, 1: Dissolution, 2: Swelling, 3: Other change (color change or the like).

(5) Calculation of Hansen Solubility Parameters and the Interaction Radius

Based on the evaluation results in (4), Hansen solubility parameters and the interaction radius were calculated by using the software HSPiP. The results are listed in Table 5.

TABLE 4

| No. | Solvent 1 | Solvent 2 | Mixing ratio (volume ratio) Solvent 1 | Solvent 2 |
|---|---|---|---|---|
| 1 | 1-Nitropropane | — | 100 | — |
| 2 | 3-Chloropropionitrile | — | 100 | — |
| 3 | Acetonitrile | Nitric acid | 50 | 50 |
| 4 | Acetic acid | — | 100 | — |
| 5 | Acetone | — | 100 | — |
| 6 | Acetonitrile | — | 100 | — |
| 7 | Dimethyl carbonate | — | 100 | — |
| 8 | Ethanol | — | 100 | — |
| 9 | Ethanol | Glycerol | 65 | 35 |
| 10 | Ethanol | Hexane | 50 | 50 |
| 11 | Ethanol | Propylene carbonate | 50 | 50 |
| 12 | Ethylene carbonate | — | 100 | — |
| 13 | Glycerol | — | 100 | — |
| 14 | Glycerol | Propylene carbonate | 44 | 56 |
| 15 | Glycerol | Propylene carbonate | 56 | 44 |
| 16 | Hexane | — | 100 | — |
| 17 | Methanol | — | 100 | — |
| 18 | Nitric acid | — | 100 | — |
| 19 | Propylene carbonate | — | 100 | — |
| 20 | Propylene carbonate | Nitric acid | 60 | 40 |
| 21 | Propylene glycol | — | 100 | — |
| 22 | Toluene | — | 100 | — |
| 23 | Toluene | Dimethyl carbonate | 44 | 56 |
| 24 | Toluene | Dimethyl carbonate | 56 | 44 |
| 25 | Water | — | 100 | — |
| 26 | Water | Acetic acid | 65 | 35 |
| 27 | Water | Nitric acid | 33 | 67 |
| 28 | γ-Butyrolactone (GBL) | — | 100 | — |
| 29 | γ-Butyrolactone (GBL) | Water | 48 | 52 |

TABLE 5

| Polymer | Hansen solubility parameter | | | Interaction radius $R_0$ |
|---|---|---|---|---|
| | D | P | H | |
| Polyacrylic acid | 14.43 | 16.40 | 32.93 | 9.7 |
| Acrylic acid ester | 16.08 | 9.97 | 7.00 | 12.5 |
| SBR | 16.22 | 5.57 | 13.58 | 15.0 |

A method for calculating Hansen solubility parameters of the electrolytic solution will be described. Based on chemical structures and a composition ratio of the components, Hansen solubility parameters of the electrolytic solution were calculated using the software HSPiP. As a result, Hansen solubility parameters of Electrolytic Solution I were D:16.3, P:12.5, and H:7.5.

Figure 5:
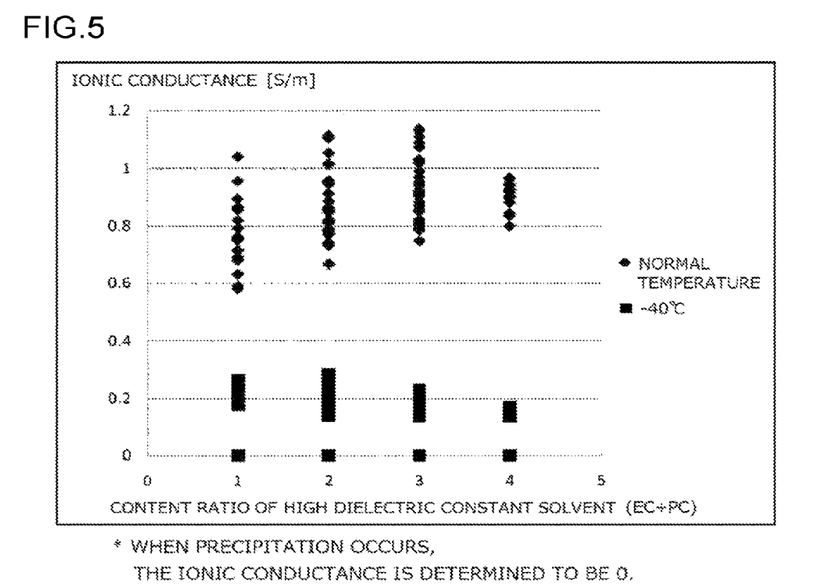
FIG. 5 is a graph illustrating a relationship between a content ratio of cyclic carbonate in an organic solvent and an ionic conductance.
Figure 6:
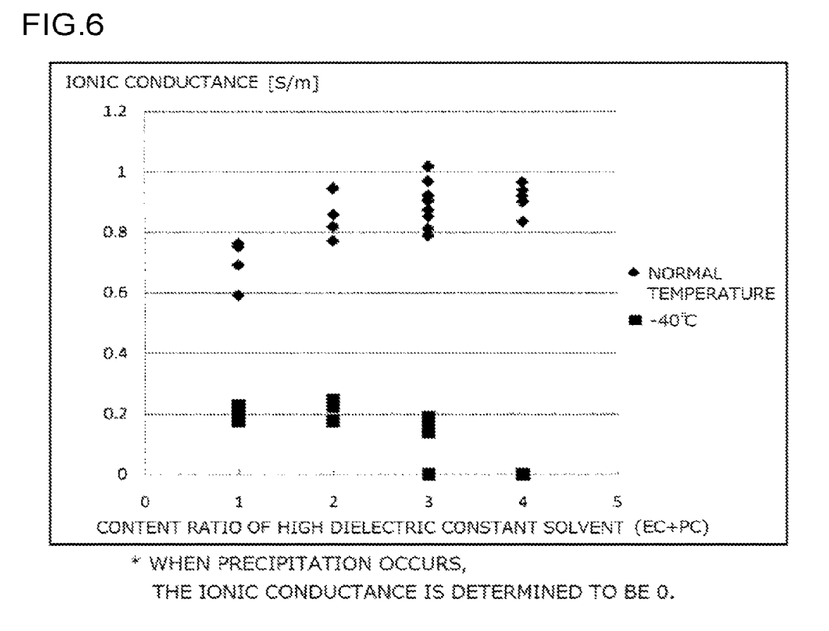
FIG. 6 is a graph illustrating a relationship between a content ratio of cyclic carbonate in an organic solvent that does not contain dimethyl carbonate and an ionic conductance.

In [Table 6], the physical properties of various solvent components used for the carbonate organic solvent are listed. In [Table 7] to [Table 9], the properties of various electrolytic solutions prepared by adding 1 mol/L of LiFSI to the various carbonate organic solvent (boiling points (a method for measuring boiling points is described below), the presence or the absence of precipitation under a low temperature environment (a method for determining the presence or the absence of precipitation is described below), and ionic conductance under normal temperature and low temperature environments) are listed. EC was used as the cyclic carbonate in [Table 7], PC was used as the cyclic carbonate in [Table 8], and EC and PC were used as a mixture as the cyclic carbonate in [Table 9]. In [Table 10] and [Table 11], the properties of various electrolytic solutions prepared by adding 1 mol/L of LiFSI to the various carbonate organic solvent (the presence or the absence of precipitation under an environment at −50° C.) are listed. The graph of FIG. 5 is a graph drawn on the basis of [Table 7] to [Table 9]. The horizontal axis indicates values of the content ratio (parts in ten) of the cyclic carbonate to the total amount of the organic solvent and the vertical axis indicates the values of the ionic conductance under normal temperature and low temperature environments. The graph of FIG. 6 is a graph drawn on the basis of [Table 9]. The horizontal axis indicates values of the content ratio (parts per ten) of the cyclic carbonate to the total amount of the organic solvent and the vertical axis indicates the values of the ionic conductance under normal temperature and low temperature environments.

A method for measuring the boiling points will be described. Here, the method for measuring the boiling points of the various electrolytic solutions listed in [Table 7] to [Table 9] will be described in detail. In this test, the separator and the like are encapsulated in an aluminum laminated foil in an Ar atmosphere. The electrolytic solution was injected therein and the aluminum laminated foil was sealed to produce the lithium ion capacitor cell. This lithium ion capacitor cell was placed in a constant-temperature chamber and the temperature of the constant-temperature chamber was raised to the predetermined temperature in steps of 5° C., followed by leaving the lithium ion capacitor cell standing for about 30 minutes. After standing for about 30 minutes, this lithium ion capacitor cell was observed. When the temperature was higher than the boiling point of the electrolytic solution, the electrolytic solution was vaporized and thus the lithium ion capacitor cell was swelled. In this test, therefore, the upper limit temperature at which the lithium ion capacitor cell was not swelled was determined to be the boiling point of each of the electrolytic solutions.

Subsequently, a method for determining the presence or the absence of the precipitation from the various electrolytic solutions listed in [Table 7] to [Table 11] will be described in detail. In this test, the separator and the like are encapsulated in a transparent container in an Ar atmosphere. The electrolytic solution was injected therein and the transparent container was sealed to produce the lithium ion capacitor cell. This lithium ion capacitor cell was placed in a constant-temperature chamber and the lithium ion capacitor cell was left standing at the predetermined temperature for 30 minutes. After standing for 30 minutes, this lithium ion capacitor cell was observed. When the lithium ion capacitor cell was not transparent (when the lithium ion capacitor cell is clouded or the like, it solidifies), it was determined that the precipitation was present.

TABLE 6

| Solvent (abbreviated name) | Molecular formula | Boiling point [° C.] | Melting point [° C.] | Viscosity [mPa · s] | Remarks |
|---|---|---|---|---|---|
| Ethylene carbonate (EC) | $C_3H_4O_3$ | 244 | 38 | 1.9 (40° C.) | Cyclic carbonate |
| Propylene carbonate (PC) | $C_4H_6O_3$ | 242 | −49 | 2.5 (25° C.) | |
| Dimethyl carbonate (DMC) | $C_3H_6O_3$ | 90 | 4 | 0.59 (25° C.) | Chain carbonate |
| Ethylmethyl carbonate (EMC) | $C_4H_8O_3$ | 107 | −55 | 0.65 (25° C.) | |
| Diethyl carbonate (DEC) | $C_5H_{10}O_3$ | 126 | −43 | 0.75 (25° C.) | |

TABLE 7

| Component ratio in carbonate organic solvent [Vol %] | | | | Boiling point [° C.] | Precipitation Absence: A Presence: P | Ionic conductance [S/m] | |
|---|---|---|---|---|---|---|---|
| Cyclic | Chain | | | | | Normal temperature [25° C.] | Low temperature [−40° C.] |
| EC | DMC | EMC | DEC | | | | |
| 30 | 30 | 40 | 0 | 105 | — | 1.032 | 0.186 |
| 10 | 0 | 90 | 0 | 110 | A | 0.762 | 0.22 |
| 10 | 0 | 0 | 90 | 120 | A | 0.591 | 0.175 |
| 10 | 60 | 30 | 0 | 95 | P | 0.955 | Solidified |
| 10 | 60 | 0 | 30 | 95 | P | 0.865 | Solidified |
| 10 | 30 | 60 | 0 | 100 | A | 0.855 | 0.266 |
| 10 | 30 | 30 | 30 | 100 | A | 0.791 | 0.262 |
| 10 | 30 | 0 | 60 | 110 | A | 0.715 | 0.222 |
| 10 | 0 | 30 | 60 | 120 | A | 0.69 | 0.19 |
| 10 | 0 | 60 | 30 | 115 | A | 0.752 | 0.225 |
| 20 | 0 | 80 | 0 | 110 | A | 0.945 | 0.245 |
| 20 | 0 | 0 | 80 | 120 | A | 0.771 | 0.175 |
| 20 | 53.3 | 26.7 | 0 | 95 | P | 1.105 | 0.256 |
| 20 | 53.3 | 0 | 26.7 | 100 | P | 1052 | Solidified |
| 20 | 26.7 | 53.3 | 0 | 100 | A | 1015 | 0.28 |
| 20 | 26.7 | 26.7 | 26.7 | 100 | A | 0.956 | 0.224 |
| 20 | 26.7 | 0 | 53.3 | 115 | P | 0.885 | 0.235 |
| 20 | 0 | 26.7 | 53.3 | 120 | A | 0.818 | 0.23 |
| 20 | 0 | 53.3 | 26.7 | 115 | A | 0.858 | 0.222 |
| 30 | 0 | 70 | 0 | 115 | P | 0.969 | 0.228 |
| 30 | 0 | 0 | 70 | 120 | P | 0.811 | 0.165 |
| 30 | 46.7 | 23.3 | 0 | 100 | P | 1.136 | 0.240 |
| 30 | 46.7 | 0 | 23.3 | 100 | P | 1.11 | Solidified |
| 30 | 23.3 | 46.7 | 0 | 110 | P | 1088 | 0.266 |
| 30 | 23.3 | 23.3 | 23.3 | 110 | P | 102 | 0.231 |
| 30 | 23.3 | 0 | 46.7 | 115 | P | 0.94 | 0.208 |
| 30 | 0 | 23.3 | 46.7 | 120 | P | 0.873 | 0.207 |
| 30 | 0 | 46.7 | 23.3 | 120 | P | 0.922 | 0.215 |

TABLE 8

| Component ratio in carbonate organic solvent [Vol %] | | | | Boiling point [° C.] | Precipitation Absence: A Presence: P | Ionic conductance [S/m] | |
|---|---|---|---|---|---|---|---|
| Cyclic | Chain | | | | | Normal temperature [25° C.] | Low temperature [−40° C.] |
| PC | DMC | EMC | DEC | | | | |
| 10 | 90 | 0 | 0 | 85 | P | 1.04 | Solidified |
| 10 | 0 | 90 | 0 | 110 | A | 0.756 | 0.231 |
| 10 | 0 | 0 | 90 | 120 | A | 0.581 | 0.183 |
| 10 | 60 | 30 | 0 | 95 | P | 0.894 | Solidified |
| 10 | 60 | 0 | 30 | 100 | P | 0.864 | Solidified |
| 10 | 30 | 60 | 0 | 100 | A | 0.819 | 0.244 |
| 10 | 30 | 30 | 30 | 100 | A | 0.751 | 0.22 |
| 10 | 30 | 0 | 60 | 100 | A | 0.713 | 0.211 |
| 10 | 0 | 30 | 60 | 120 | A | 0.632 | 0.198 |
| 10 | 0 | 60 | 30 | 115 | A | 0.68 | 0.207 |
| 20 | 80 | 0 | 0 | 85 | P | 1.113 | Solidified |
| 20 | 0 | 80 | 0 | 110 | A | 0.855 | 0.284 |
| 20 | 0 | 0 | 80 | 120 | A | 0.667 | 0.199 |
| 20 | 53.3 | 26.7 | 0 | 95 | P | 1.014 | Solidified |
| 20 | 53.3 | 0 | 26.7 | 100 | P | 0.948 | Solidified |
| 20 | 26.7 | 53.3 | 0 | 100 | A | 0.949 | 0.263 |
| 20 | 26.7 | 26.7 | 26.7 | 100 | A | 0.864 | 0.245 |
| 20 | 26.7 | 0 | 53.3 | 110 | A | 0.811 | 0.235 |
| 20 | 0 | 26.7 | 53.3 | 115 | A | 0.74 | 0.19 |
| 20 | 0 | 53.3 | 26.7 | 115 | A | 0.787 | 0.232 |
| 30 | 70 | 0 | 0 | 95 | P | 1.13 | Solidified |
| 30 | 0 | 70 | 0 | 115 | A | 0.923 | 0.217 |
| 30 | 0 | 0 | 70 | 120 | A | 0.747 | 0.171 |
| 30 | 46.7 | 23.3 | 0 | 100 | P | 1.072 | Solidified |
| 30 | 46.7 | 0 | 23.3 | 100 | P | 1.03 | Solidified |
| 30 | 23.3 | 46.7 | 0 | 100 | A | 0.989 | 0.223 |
| 30 | 23.3 | 23.3 | 23.3 | 110 | A | 0.914 | 0.213 |
| 30 | 23.3 | 0 | 46.7 | 110 | A | 0.87 | 0.229 |
| 30 | 0 | 23.3 | 46.7 | 120 | A | 0.785 | 0.185 |
| 30 | 0 | 46.7 | 23.3 | 120 | A | 0.855 | 0.211 |

TABLE 9

| Component ratio in carbonate organic solvent [Vol %] | | | | Boiling point [° C.] | Precipitation Absence: A Presence: P | Ionic conductance [S/m] | |
|---|---|---|---|---|---|---|---|
| Cyclic | | Chain | | | | Normal temperature [25° C.] | Low temperature [−40° C.] |
| EC | PC | EMC | DEC | | | | |
| 10 | 10 | 80 | 0 | 110 | A | 0.912 | 0.1825 |
| 10 | 10 | 0 | 80 | 125 | A | 0.732 | 0.1366 |
| 10 | 10 | 26.7 | 53.3 | 120 | A | 0.781 | 0.1539 |
| 10 | 10 | 40 | 40 | 120 | A | 0.82 | 0.1552 |
| 10 | 10 | 53.3 | 26.7 | 115 | A | 0.847 | 0.1843 |
| 10 | 20 | 70 | 0 | 110 | A | 0.952 | 0.1686 |
| 10 | 20 | 0 | 70 | 125 | A | 0.806 | 0.1338 |
| 10 | 20 | 23.3 | 46.7 | 125 | A | 0.821 | 0.1534 |
| 10 | 20 | 35 | 35 | 125 | A | 0.851 | 0.1558 |
| 10 | 20 | 46.7 | 23.3 | 120 | A | 0.884 | 0.1541 |
| 10 | 30 | 60 | 0 | 120 | A | 0.962 | 0.1721 |
| 10 | 30 | 0 | 60 | 125 | A | 0.8 | 0.134 |
| 10 | 30 | 20 | 40 | 125 | A | 0.881 | 0.1524 |
| 10 | 30 | 30 | 30 | 125 | A | 0.926 | 0.1482 |
| 10 | 30 | 40 | 20 | 125 | A | 0.916 | 0.1517 |
| 20 | 10 | 70 | 0 | 115 | A | 1.018 | 0.1762 |
| 20 | 10 | 0 | 70 | 125 | A | 0.789 | 0.14 |
| 20 | 10 | 23.3 | 46.7 | 125 | A | 0.852 | 0.1705 |
| 20 | 10 | 35 | 35 | 125 | A | 0.904 | 0.1543 |
| 20 | 10 | 46.7 | 23.3 | 125 | A | 0.906 | 0.189 |
| 20 | 20 | 60 | 0 | 125 | A | 0.965 | 0.172 |
| 20 | 20 | 0 | 60 | 125 | A | 0.842 | 0.1532 |
| 20 | 20 | 20 | 40 | 125 | A | 0.883 | 0.1334 |
| 20 | 20 | 30 | 30 | 125 | A | 0.897 | 0.1416 |
| 20 | 20 | 40 | 20 | 125 | A | 0.945 | 0.1574 |
| 30 | 10 | 60 | 0 | 120 | P | 0.966 | Precipitation |

TABLE 9-continued

| Component ratio in carbonate organic solvent [Vol %] | | | | Boiling point [° C.] | Precipitation Absence: A Presence: P | Ionic conductance [S/m] | |
|---|---|---|---|---|---|---|---|
| Cyclic | | Chain | | | | Normal temperature [25° C.] | Low temperature [−40° C.] |
| EC | PC | EMC | DEC | | | | |
| 30 | 10 | 0 | 60 | 125 | P | 0.835 | Precipitation |
| 30 | 10 | 20 | 40 | 125 | P | 0.901 | Precipitation |
| 30 | 10 | 30 | 30 | 125 | P | 0.92 | Precipitation |
| 30 | 10 | 40 | 20 | 125 | P | 0.939 | Precipitation |

TABLE 10

| Component ratio in carbonate organic solvent [Vol %] | | | Precipitation at −50° C. Absence: A Presence: P |
|---|---|---|---|
| Cyclic | Chain | | |
| EC | EMC | DEC | |
| 25 | 0 | 75 | A |
| 25 | 25 | 50 | A |
| 25 | 37.5 | 37.5 | A |
| 25 | 50 | 25 | A |
| 25 | 75 | 0 | A |
| 30 | 0 | 70 | P |
| 30 | 23.3 | 46.7 | A |
| 30 | 35 | 35 | A |
| 30 | 46.7 | 23.3 | A |
| 30 | 70 | 0 | A |
| 35 | 0 | 65 | P |
| 35 | 21.7 | 43.3 | P |
| 35 | 32.5 | 32.5 | P |
| 35 | 43.3 | 21.7 | P |
| 35 | 65 | 0 | P |
| 40 | 0 | 60 | P |
| 40 | 20 | 40 | P |
| 40 | 30 | 30 | P |
| 40 | 40 | 20 | P |
| 40 | 60 | 0 | P |

TABLE 11

| Component ratio in carbonate organic solvent [Vol %] | | | | EC + PC [Vol %] | Precipitation at −50° C. Absence: A Presence: P |
|---|---|---|---|---|---|
| Cyclic | | Chain | | | |
| EC | PC | EMC | DEC | | |
| 25 | 5 | 0 | 70 | 30 | A |
| 25 | 5 | 23.3 | 46.7 | 30 | A |
| 25 | 5 | 35 | 35 | 30 | A |
| 25 | 5 | 46.7 | 23.3 | 30 | A |
| 25 | 5 | 70 | 0 | 30 | A |
| 25 | 10 | 0 | 65 | 35 | A |
| 25 | 10 | 21.7 | 43.3 | 35 | A |
| 25 | 10 | 32.5 | 32.5 | 35 | A |
| 25 | 10 | 43.3 | 21.7 | 35 | A |
| 25 | 10 | 65 | 0 | 35 | A |
| 30 | 5 | 0 | 65 | 35 | P |
| 30 | 5 | 21.7 | 43.3 | 35 | A |
| 30 | 5 | 32.5 | 32.5 | 35 | A |
| 30 | 5 | 43.3 | 21.7 | 35 | A |
| 30 | 5 | 65 | 0 | 35 | A |
| 25 | 15 | 0 | 60 | 40 | A |
| 25 | 15 | 20 | 40 | 40 | A |
| 25 | 15 | 30 | 30 | 40 | A |
| 25 | 15 | 40 | 20 | 40 | A |
| 25 | 15 | 60 | 0 | 40 | A |
| 30 | 10 | 60 | 0 | 40 | A |
| 35 | 5 | 0 | 60 | 40 | P |
| 35 | 5 | 20 | 40 | 40 | P |
| 35 | 5 | 30 | 30 | 40 | P |
| 35 | 5 | 40 | 20 | 40 | A |
| 35 | 5 | 60 | 0 | 40 | P |
| 35 | 10 | 55 | 0 | 45 | P |
| 40 | 5 | 55 | 0 | 45 | P |
| 35 | 15 | 50 | 0 | 50 | A |
| 40 | 10 | 50 | 0 | 50 | P |
| 30 | 25 | 45 | 0 | 55 | A |
| 35 | 20 | 45 | 0 | 55 | P |
| 40 | 15 | 45 | 0 | 55 | P |
| 45 | 10 | 45 | 0 | 55 | P |
| 50 | 5 | 45 | 0 | 55 | P |

With reference to [Table 7] and [Table 8], it was found that the boiling points of the electrolytic solutions were lowered when dimethyl carbonate (DMC) was contained in the organic solvents. Thus, it is easily inferred that the use of dimethyl carbonate (DMC) as the organic solvent was more likely to cause increase in the internal resistance and deterioration in the heat resistance of the electrolytic solution (this inference, however, does not limit the present invention). With reference to [Table 7] to [Table 9], it was found that the boiling points of the electrolytic solutions were increased when ethylmethyl carbonate (EMC) or diethyl carbonate (DEC) was contained in the electrolytic solutions instead of dimethyl carbonate (DMC). In consideration of the use of the lithium ion capacitor under a high temperature environment, it was found that the use of ethylmethyl carbonate (EMC) or diethyl carbonate (DEC) as the chain carbonate was preferable. From the viewpoint of improvement in both ionic conductance and heat resistance of the electrolytic solutions, it was found that the use of ethylmethyl carbonate (EMC) and diethyl carbonate (DEC) as a mixture is further preferable.

With reference to [Table 10], the precipitation of the solvent components was observed in the electrolytic solution containing the organic solvents containing 35% by volume or more of ethylene carbonate (EC). It was found that when ethylene carbonate (EC) was used as the cyclic carbonate, a content of less than 35% by volume of ethylene carbonate (EC) in the organic solvent was preferable.

With reference to [Table 11], it was found that the use of propylene carbonate (PC) and ethylene carbonate (EC) as a mixture suppressed the solidification of the electrolytic solutions or the precipitation of the solvent components as much as possible while increasing the content of the cyclic carbonate in the organic solvent. The electrolytic solutions of the organic solvents containing ethylene carbonate (EC) and propylene carbonate (PC) in a total amount of 55% by volume or more had extremely high possibility of solidification. With reference to FIG. 5 and FIG. 6, the electrolytic solutions of the organic solvents containing ethylene carbonate (EC) and propylene carbonate (PC) in a total amount of 40% by volume or more tended to decrease ionic conductance under the low temperature environment. Thus, it was found that the ratio of the total amount of ethylene carbonate (EC) and propylene carbonate (PC) to the total amount of the organic solvent is preferably set to less than 55% by volume and more preferably set to less than 40% by volume. It was also found that the desired ionic conductance was obtained in a wider temperature range (for example, in a range of 25° C. to −40° C.) while the solidification etc. of the electrolytic solution was suppressed as much as possible by setting the ratio of the total amount of ethylene carbonate (EC) and propylene carbonate (PC) to the total amount of the organic solvent to 35% by volume to 20% by volume.

What is claimed is:

1. A lithium ion capacitor comprising:
    a positive electrode;
    a negative electrode; and
    an electrolytic solution contacting to the positive electrode and the negative electrode, wherein
    the electrolytic solution includes an organic solvent and a lithium salt electrolyte having an imide structure;
    the positive electrode includes a collector foil and a positive electrode active material; and
    the positive electrode active material is held onto the collector foil by means of a binder including a polymer having a RED value to the electrolytic solution of more than 1, the RED value representing a relative energy difference with respect to the electrolytic solution based on Hansen solubility parameters.

2. The lithium ion capacitor according to claim 1, wherein the polymer is polyacrylic acid.

3. The lithium ion capacitor according to claim 1, wherein the organic solvent does not include dimethyl carbonate and includes ethylene carbonate and propylene carbonate, and an amount of the ethylene carbonate in the organic solvent is larger than an amount of the propylene carbonate in the organic solvent.

4. The lithium ion capacitor according to claim 3, wherein a ratio of the ethylene carbonate contained in the organic solvent is less than 35% by volume.

5. The lithium ion capacitor according to claim 3, wherein a ratio of a total amount of the ethylene carbonate and the propylene carbonate in the organic solvent to a total amount of the organic solvent is less than 55% by volume.

6. The lithium ion capacitor according to claim 3, wherein a ratio of a total amount of the ethylene carbonate and the propylene carbonate in the organic solvent to a total amount of the organic solvent is 35% by volume to 20% by volume.

7. The lithium ion capacitor according to claim 1, wherein the organic solvent includes ethylmethyl carbonate and diethyl carbonate.

* * * * *